United States Patent
Tsukamoto et al.

(10) Patent No.: US 11,609,191 B2
(45) Date of Patent: Mar. 21, 2023

(54) ANALYZER

(71) Applicant: JEOL Ltd., Tokyo (JP)

(72) Inventors: Kazunori Tsukamoto, Tokyo (JP);
Shigeru Honda, Tokyo (JP)

(73) Assignee: JEOL Ltd., Tokyo (JP)

( * ) Notice: Subject to any disclaimer, the term of this patent is extended or adjusted under 35 U.S.C. 154(b) by 297 days.

(21) Appl. No.: 16/934,340

(22) Filed: Jul. 21, 2020

(65) Prior Publication Data
US 2021/0025838 A1    Jan. 28, 2021

(30) Foreign Application Priority Data

Jul. 24, 2019  (JP) .............................. JP2019-135951

(51) Int. Cl.
| | | |
|---|---|---|
| *G01N 23/2209* | (2018.01) | |
| *G01N 23/2208* | (2018.01) | |
| *G01N 23/2252* | (2018.01) | |

(52) U.S. Cl.
CPC ..... *G01N 23/2209* (2018.02); *G01N 23/2208* (2013.01); *G01N 23/2252* (2013.01); *G01N 2223/072* (2013.01); *G01N 2223/079* (2013.01); *G01N 2223/507* (2013.01)

(58) Field of Classification Search
CPC .......... G01N 23/2209; G01N 23/2252; G01N 23/2208; G01N 23/2206; G01N 2223/507; G01N 2223/079; G01N 2223/072
See application file for complete search history.

(56) References Cited

U.S. PATENT DOCUMENTS

| | | |
|---|---|---|
| 6,292,532 B1 | 9/2001 | Kawahara et al. |
| 8,155,270 B2 | 4/2012 | Rohde et al. |
| 2019/0006146 A1 | 1/2019 | Sakamae |

FOREIGN PATENT DOCUMENTS

| | | |
|---|---|---|
| JP | S5148986 A | 4/1976 |
| JP | S6193938 A | 5/1986 |
| JP | H11307031 A | 11/1999 |
| JP | 2000199748 A | 7/2000 |
| JP | 2019012019 A | 1/2019 |

OTHER PUBLICATIONS

Extended European Search Report issued in EP20186786.8 dated Feb. 23, 2021.
Office Action issued in JP2019-135951 dated Dec. 15, 2020.

*Primary Examiner* — Jurie Yun
(74) *Attorney, Agent, or Firm* — The Webb Law Firm

(57) ABSTRACT

An analyzer includes a wavelength-dispersive X-ray spectrometer and a control unit that controls the wavelength-dispersive X-ray spectrometer, the control unit performing: processing of acquiring an analysis result of preparatory analysis performed on a specimen to be analyzed; processing of setting spectroscopic conditions for WDS analysis using the wavelength-dispersive X-ray spectrometer based on the analysis result of the preparatory analysis; and processing of performing the WDS analysis on the specimen to be analyzed under the set spectroscopic conditions.

8 Claims, 17 Drawing Sheets

| SPECIMEN NAME | STAINLESS STEEL | ALUMINUM ALLOY | · · · |
|---|---|---|---|
| CONSTITUENT ELEMENTS | C,Si,Cr,Fe,Ni | Si,Fe,Cu,Zn,Pb,Al | · · · |
| CONCENTRATIONS | C  0.056wt%<br>Si  0.47wt%<br>Cr  18.17wt%<br>Fe  72.954wt%<br>Ni  8.35wt% | Si  0.04wt%<br>Fe  0.7wt%<br>Cu  5.3wt%<br>Zn  0.31wt%<br>Pb  0.25wt%<br>Al  93.4wt% | · · · |

FIG. 4

| SPECIMEN NAME | STAINLESS STEEL | ALUMINUM ALLOY | ... |
|---|---|---|---|
| CONSTITUENT ELEMENTS | C,Si,Cr,Fe,Ni | Si,Fe,Cu,Zn,Pb,Al | ... |
| CONCENTRATIONS | C  0.056wt%<br>Si  0.47wt%<br>Cr  18.17wt%<br>Fe  72.954wt%<br>Ni  8.35wt% | Si  0.04wt%<br>Fe  0.7wt%<br>Cu  5.3wt%<br>Zn  0.31wt%<br>Pb  0.25wt%<br>Al  93.4wt% | ... |
| ANALYSIS CONDITIONS | ○ CONDITIONS FOR SPECTROMETER<br>WDS1  LDE<br>WDS2  TAP<br>⋮<br>○ ELECTROOPTICAL CONDITIONS<br>ACCELERATION VOLTAGE: 15kV<br>PROBE CURRENT: 20nA<br>⋮ | ... | ... |

FIG. 6

ANALYZER

CROSS-REFERENCE TO RELATED APPLICATION

This application claims priority to Japanese Patent Application No. 2019-135951 filed Jul. 24, 2019, the disclosure of which is hereby incorporated by reference in its entirety.

BACKGROUND OF THE INVENTION

Field of the Invention

The present invention relates to an analyzer.

Description of Related Art

There has been known an electron probe micro analyzer (EPMA) which applies an electron beam to a surface of a specimen, spectroscopically analyzes a characteristic X-ray emitted from the specimen, and detects the spectroscopically analyzed characteristic X-ray to analyze the specimen. In the electron probe micro analyzer, a wavelength-dispersive X-ray spectrometer (WDS) is typically mounted (see, e.g., JP-A-2019-012019).

When mapping analysis is performed in the EPMA, first, a distribution of a composition of the specimen is checked using a backscattered electron image or the like. Then, an electron beam is applied to a place where elements included in the specimen are intended to be specified to perform qualitative analysis using WDS analysis. Then, a user determines analysis target elements based on a result of the qualitative analysis, and inputs analysis conditions corresponding to the analysis target elements to the EPMA. The EPMA performs the WDS analysis based on the input analysis conditions.

When the WDS analysis is performed, spectroscopic conditions corresponding to a specimen to be analyzed are set. For example, when the WDS analysis is performed, it is required to select a spectroscopic element (spectroscopic crystal) capable of spectroscopically analyzing a characteristic X-ray intrinsic to each of the analysis target elements. Thus, the analysis conditions for the WDS analysis include the spectroscopic conditions specific to the WDS analysis, and accordingly an operator is required to have knowledge about a spectroscopic element and the like. As a result, there is a demand for an analyzer which allows the spectroscopic conditions for the WDS analysis to be easily set.

SUMMARY OF THE INVENTION

According to a first aspect of the invention, there is provided an analyzer including:

a wavelength-dispersive X-ray spectrometer; and a control unit that controls the wavelength-dispersive X-ray spectrometer, the control unit performing:

processing of acquiring an analysis result of preparatory analysis performed on a specimen to be analyzed by using an X-ray fluorescence analyzer;

processing of setting spectroscopic conditions for WDS analysis using the wavelength-dispersive X-ray spectrometer based on the analysis result of the preparatory analysis; and processing of performing the WDS analysis on the specimen to be analyzed under the set spectroscopic conditions.

According to a second aspect of the invention, there is provided an analyzer including:

a wavelength-dispersive X-ray spectrometer; and a control unit that controls the wavelength-dispersive X-ray spectrometer, the control unit performing:

processing of acquiring an analysis result of preparatory analysis performed on a specimen to be analyzed by using an energy-dispersive X-ray spectrometer;

processing of setting spectroscopic conditions for WDS analysis using the wavelength-dispersive X-ray spectrometer based on the analysis result of the preparatory analysis; and processing of performing the WDS analysis on the specimen to be analyzed under the set spectroscopic conditions.

BRIEF DESCRIPTION OF THE DRAWINGS

FIG. 4 is a table for illustrating a database.

FIG. 6 is a table for illustrating a database.

DESCRIPTION OF THE INVENTION

According to one embodiment of the invention, there is provided an analyzer including:

a wavelength-dispersive X-ray spectrometer; and a control unit that controls the wavelength-dispersive X-ray spectrometer, the control unit performing:

processing of acquiring an analysis result of preparatory analysis performed on a specimen to be analyzed by using an X-ray fluorescence analyzer;

processing of setting spectroscopic conditions for WDS analysis using the wavelength-dispersive X-ray spectrometer based on the analysis result of the preparatory analysis; and processing of performing the WDS analysis on the specimen to be analyzed under the set spectroscopic conditions.

In the analyzer described above, the control unit sets the spectroscopic conditions for the WDS analysis based on the analysis result of the preparatory analysis. Accordingly, it is possible to easily perform the WDS analysis.

According to one embodiment of the invention, there is provided an analyzer including:

a wavelength-dispersive X-ray spectrometer; and a control unit that controls the wavelength-dispersive X-ray spectrometer, the control unit performing:

processing of acquiring an analysis result of preparatory analysis performed on a specimen to be analyzed by using an energy-dispersive X-ray spectrometer;

processing of setting spectroscopic conditions for WDS analysis using the wavelength-dispersive X-ray spectrometer based on the analysis result of the preparatory analysis; and processing of performing the WDS analysis on the specimen to be analyzed under the set spectroscopic conditions.

In the analyzer described above, the control unit sets the spectroscopic conditions for the WDS analysis based on the analysis result of the preparatory analysis. Accordingly, it is possible to easily perform the WDS analysis.

Embodiments of the invention are described in detail below with reference to the drawings. It is noted that the following embodiments do not unduly limit the scope of the invention as stated in the claims. In addition, all of the elements described below are not necessarily essential requirements of the invention.

1. First Embodiment

1.1. Analyzer

Figure 1:
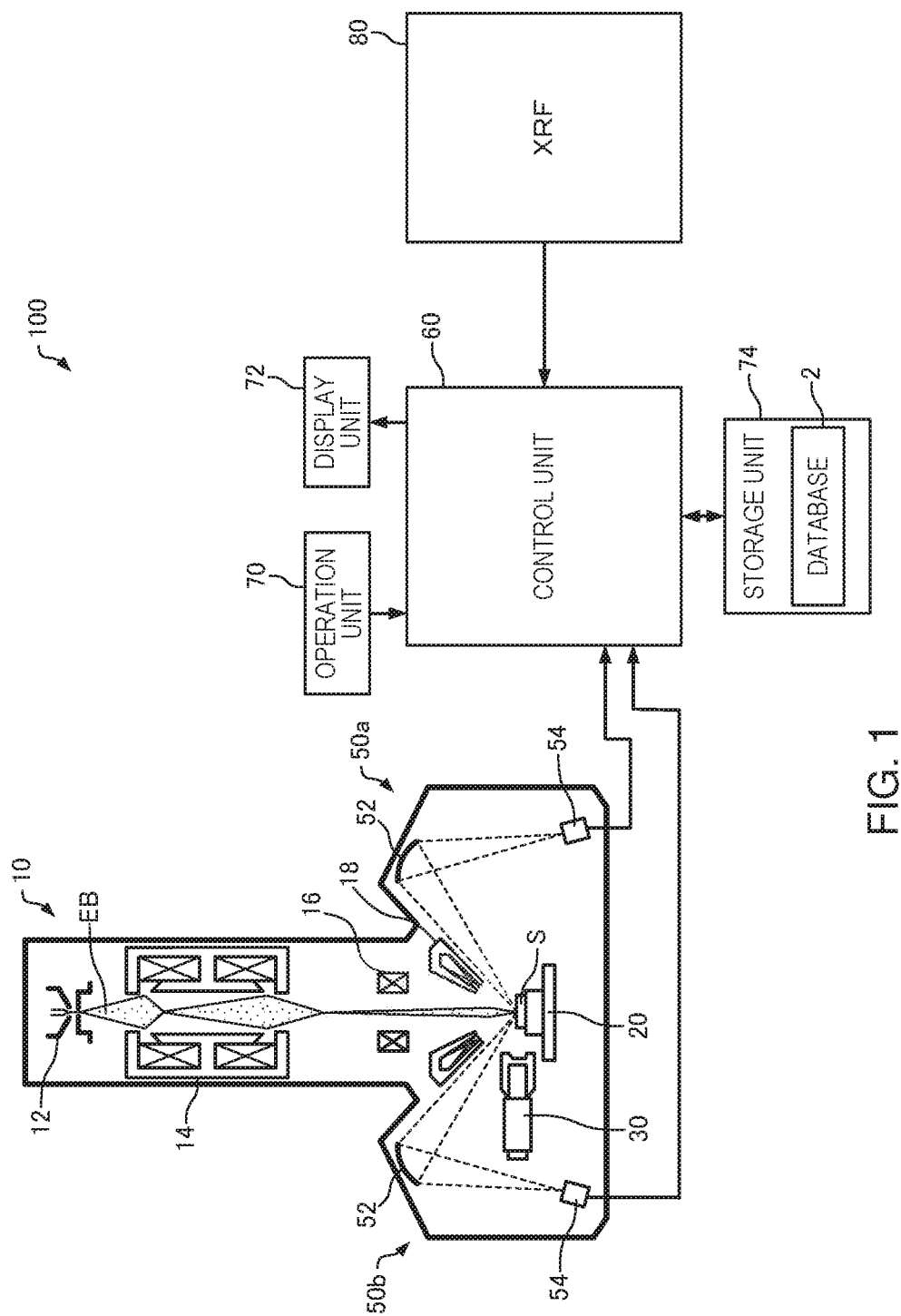
FIG. 1 is a diagram illustrating a configuration of an analyzer according to a first embodiment.
Figure 2:
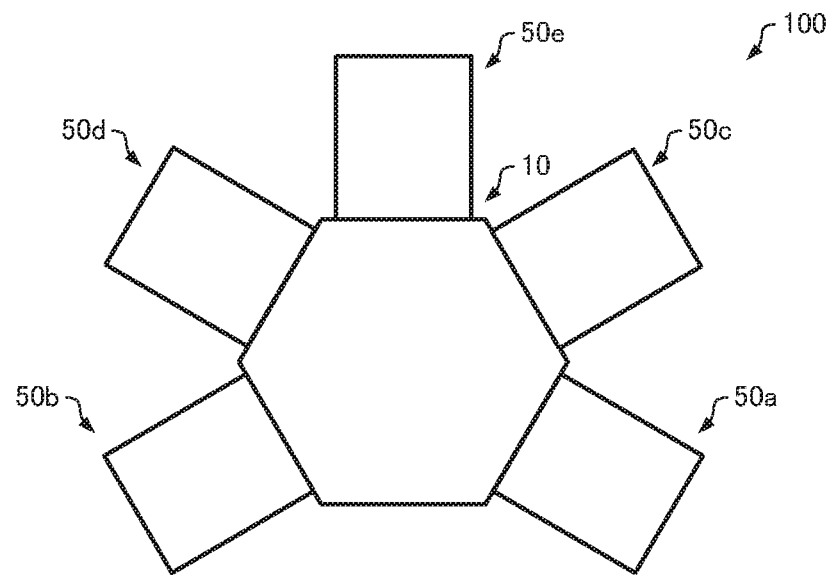
FIG. 2 is a diagram illustrating a configuration of the analyzer according to the first embodiment.

First, referring to the drawings, a description will be given of an analyzer according to a first embodiment. FIGS. 1 and 2 are diagrams each illustrating a configuration of an analyzer 100 according to the first embodiment. The analyzer 100 is an EPMA including a plurality of wavelength-dispersive X-ray spectrometers (WDSs). Note that the analyzer 100 may also be a scanning electron microscope provided with WDSs.

As illustrated in FIGS. 1 and 2, the analyzer 100 includes an electrooptical system 10, a specimen stage 20, an electron detector 30, WDSs 50a, 50b, 50c, 50d, and 50e, a control unit 60, an operation unit 70, a display unit 72, a storage unit 74, and an X-ray fluorescence analyzer (XRF) 80. Note that, in FIG. 2, for the sake of convenience, only the electrooptical system 10 and the WDSs 50a, 50b, 50c, 50d, and 50e are illustrated.

The electrooptical system 10 forms an electron probe made of an electron beam EB. The electrooptical system 10 includes an electron gun 12, a focusing lens 14, a deflector 16, and an objective lens 18.

The electron gun 12 generates the electron beam EB. The electron gun 12 emits the electron beam EB accelerated with a predetermined acceleration voltage toward a specimen S.

The focusing lens 14 is a lens for focusing the electron beam EB emitted from the electron gun 12. The deflector 16 two-dimensionally deflects the electron beam EB. The deflector 16 allows the surface of the specimen S to be scanned with the electron probe. The objective lens 18 is a lens for focusing the electron beam EB onto the specimen S. Through the focusing of the electron beam EB by the focusing lens 14 and the objective lens 18, the electron probe is formed.

The specimen stage 20 supports the specimen S. On the specimen stage 20, the specimen S is placed. The specimen stage 20 includes a moving mechanism for moving the specimen S, though not illustrated. By moving the specimen S over the specimen stage 20, it is possible to move a position on the specimen S to which the electron beam EB is applied.

The electron detector 30 is a detector for detecting electrons emitted from the specimen S. Through detection of the electrons emitted from the specimen S by the electron detector 30, a scanning electron microscope image (SEM image) can be acquired. The electron detector 30 may be a backscattered electron detector which detects backscattered electrons or a secondary electron detector which detects secondary electrons.

The WDS 50a includes a spectroscopic element (spectroscopic crystal) 52 and an X-ray detector 54. In the WDS 50a, the spectroscopic element 52 spectroscopically analyzes a characteristic X-ray generated from the specimen S, while the X-ray detector 54 detects the spectroscopically analyzed X-ray.

For example, the spectroscopic element 52 is a spectroscopic crystal for performing spectroscopic analysis using a phenomenon of X-ray diffraction. The WDS 50a includes a plurality of the spectroscopic elements 52 having different crystal plane intervals. In other words, the plurality of spectroscopic elements 52 have different spectroscopic wavelength ranges. As each of the spectroscopic elements 52, PET (Penta-erythritol), LiF (Lithium fluoride), TAP (Thallium hydrogen acid phthalate), LDE (Layered dispersion element), or the like can be used. The X-ray detector 54 detects the characteristic X-ray spectroscopically analyzed by the spectroscopic elements 52.

As illustrated in FIG. 2, the analyzer 100 includes the WDS 50a, the WDS 50b, the WDS 50c, the WDS 50d, and the WDS 50e. Each of the five WDSs has the plurality of spectroscopic elements 52. Accordingly, the analyzer 100 can perform WDS analysis in a wide spectroscopic wavelength range and detect various elements. In addition, the analyzer 100 can also perform, e.g., simultaneous mapping analysis of five elements.

An XRF 80 applies an X-ray to the specimen, detects a fluorescence X-ray generated from the specimen S, and generates an XRF spectrum. The XRF 80 performs qualitative analysis and quantitative analysis based on the generated XRF spectrum. The XRF 80 and the control unit 60 are connected via a network such as, e.g., a local area network (LAN).

The operation unit 70 performs a processing step of acquiring an operation signal responding to an operation performed by a user and transmitting the operation signal to the control unit 60. For example, the operation unit 70 is a button, a key, a touch panel display, a microphone, or the like.

The display unit 72 displays an image generated by the control unit 60. The display unit 72 can be implemented by a display such as, e.g., a liquid crystal display (LCD).

The storage unit 74 stores programs and data for causing the control unit 60 to perform various calculation processing and control processing. The storage unit 74 is used also as a work area for the control unit 60. For example, the storage unit 74 can be implemented by a random access memory (RAM), a read only memory (ROM), a hard disk, or the like. The storage unit 74 includes a database 2. The database 2 stores, for each type of the specimen, information on elements included in the specimen and information on respective concentrations of the elements included in the specimen.

The control unit 60 performs such processing steps as a processing step of acquiring an analysis result of XRF analysis and a processing step of performing the WDS analysis. A function of the control unit 60 can be implemented through execution of the programs stored in the storage unit 74 by various processors (such as a central processing unit (CPU)).

The control unit 60 acquires the analysis result of the XRF analysis from the XRF 80. An analysis result of the XRF analysis includes a result of the qualitative analysis, a result of the quantitative analysis, and the XRF spectrum. The result of the quantitative analysis is information on the concentration of each of the elements included in the specimen. Note that the result of the quantitative analysis may also be a relative intensity (K-ratio) of an X-ray which can be converted to the concentration of each of the elements included in the specimen. Note that the control unit 60 may also acquire, from the XRF 80, information on a position at which the XRF analysis was performed or the like together with the analysis result.

The control unit 60 controls the electrooptical system 10 and the WDSs 50a, 50b, 50c, 50d, and 50e. The control unit 60 controls the electrooptical system 10 and the WDSs 50a, 50b, 50c, 50d, and 50e to perform the WDS analysis. Specifically, the control unit 60 sets analysis conditions for the WDS analysis based on the analysis result of the XRF analysis and controls the electrooptical system 10 and the WDSs 50a, 50b, 50c, 50d, and 50e based on the set analysis conditions to perform the WDS analysis. Thus, the control unit 60 automatically sets the analysis conditions based on the analysis result of the XRF analysis and performs the WDS analysis.

The WDS analysis includes point analysis, line analysis, and map analysis. The control unit 60 acquires output signals from the WDSs 50a, 50b, 50c, 50d, and 50e and generates WDS spectra, a line profile of each of the elements, a map of each of the elements, and the like.

1.2. Processing

1.2.1 Flow of Processing in Control Unit

When WDS analysis is performed using the analyzer 100, first, the XRF analysis is performed using the XRF 80 on a specimen to be analyzed to thereby perform preparatory analysis. Thus, it is possible to obtain a result of the quantitative analysis performed on the specimen to be analyzed.

Next, the user observes the SEM image of the specimen in the analyzer 100 and sets an analysis method and an analysis region. As the analysis method, any of the point analysis, the line analysis, and the mapping analysis is set herein.

Figure 3:
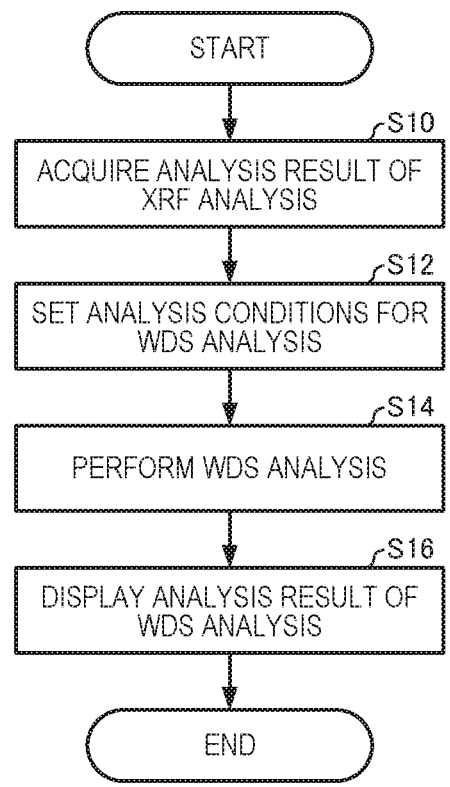
FIG. 3 is a flow chart illustrating an example of processing performed in a control unit of the analyzer according to the first embodiment.

Next, when the user inputs an instruction to start the WDS analysis to the analyzer 100 via the operation unit 70, the control unit 60 starts processing for performing the WDS analysis. FIG. 3 is a flow chart illustrating an example of the processing performed in the control unit 60 of the analyzer 100.

First, the control unit 60 acquires the analysis result of the XRF analysis from the XRF 80 (S10). Then, the control unit 60 sets the analysis conditions for the WDS analysis based on the analysis result of the XRF analysis (S12). Then, the control unit 60 performs the WDS analysis on the specimen to be analyzed under the set analysis conditions (S14). The control unit 60 causes the display unit 72 to display an analysis result of the WDS analysis obtained by performing the WDS analysis (S16).

1.2.2. Setting of Analysis Conditions

Next, a description will be given of a processing step (S12) of setting the analysis conditions for the WDS analysis. The control unit 60 sets the analysis conditions for the WDS analysis based on the analysis result of the XRF analysis. The analysis conditions for the WDS analysis include analysis target elements, spectroscopic conditions, and electrooptical conditions.

(1) Setting of Analysis Target Elements

The control unit 60 searches the database 2 to extract a specimen having a result highly similar to the result of the quantitative analysis using the XRF analysis, acquire information on elements included in the extracted specimen from the database 2, and set the analysis target elements.

FIG. 4 is a table for illustrating the database 2.

As illustrated in FIG. 4, the database 2 stores a specimen name indicating a type of the specimen, the information on the elements included in the specimen, and information on the concentrations of the elements included in the specimen.

For example, in the database 2, stainless steel is stored as the specimen name, C, Si, Cr, Fe, and Ni are stored as the elements included in the specimen, and C-0.056 wt %, Si-0.47 wt %, Cr-18.17 wt %, Fe-72.95 wt %, and Ni-8.35 wt % are stored as the concentrations of the elements included in the specimen.

For example, when the result of the quantitative analysis using the XRF analysis is most similar to the concentrations of the individual elements included in the stainless steel as a result of the searching of the database 2, the control unit 60 acquires the information on the elements included in the stainless steel from the database 2. Then, the control unit 60 sets the acquired elements included in the stainless steel as the analysis target elements. Specifically, the control unit 60 sets C, Si, Cr, Fe, and Ni illustrated in FIG. 4 as the analysis target elements.

It is to be noted herein that, in the XRF analysis, sensitivities with which light elements such as B, C, and N are detected are lower than those in the WDS analysis. Accordingly, when the specimen includes only minute amounts of these light elements, these light elements may not be able to be detected in the XRF analysis. Consequently, when, e.g., the elements detected in the XRF analysis are set as the analysis target elements, these light elements may not be included in the analysis target elements.

In the database 2, the elements included in the specimen include these light elements. Therefore, even when these light elements are not detected in the XRF analysis, by searching the database 2 and setting the analysis target elements, it is possible to set these light elements as the analysis target elements. By thus causing the database 2 to include the elements which cannot be detected in the XRF analysis, but can be detected in the WDS analysis as the elements included in the specimen, it is possible to perform the WDS analysis without missing even the minute amounts of the light elements.

(2) Setting of Spectroscopic Conditions

The control unit 60 sets the spectroscopic conditions based on the set analysis target elements. The spectroscopic conditions include the spectroscopic wavelength range in the WDS analysis. The spectroscopic wavelength range is a wavelength range in which an X-ray is spectroscopically analyzed in the WDS analysis, and an X-ray within the set spectroscopic wavelength range is detected by the X-ray detector 54.

In the WDS, the spectroscopic wavelength range is determined by the type of the spectrometer and the spectroscopic element. Accordingly, the control unit 60 selects, for each one of the analysis target elements, the WDS 50*a*, 50*b*, 50*c*, 50*d*, or 50*e* and the spectroscopic element 52 that can detect the analysis target element.

When, e.g., C, Si, Cr, Fe, and Ni are set as the analysis targets, the control unit 60 selects the LDE as the spectroscopic element 52 for the WDS 50*a* to allow C to be measured, selects the TAP as the spectroscopic element 52 for the WDS 50*b* to allow Si to be measured, selects the LiF as the spectroscopic element 52 for the WDS 50*c* to allow Cr to be measured, selects the LiF as the spectroscopic element 52 for the WDS 50*e* to allow Fe to be measured, and selects the LiF as the spectroscopic element 52 for the WDS 50*d* to allow Ni to be measured.

Note that, in the analyzer 100, the five WDSs are mounted, and therefore five elements can simultaneously be measured. When the number of the analysis target elements is larger than five, the control unit 60 sets an order of the elements to be measured based on the result of the preparatory analysis. Specifically, the control unit 60 sets the order of the elements to be measured based on information on elements susceptible to an electron beam damage which is preliminarily stored in the storage unit 74 such that, among the analysis target elements, those more susceptible to the electron beam damage are measured earlier.

(3) Setting of Electrooptical Conditions

The control unit 60 sets the electrooptical conditions based on a result of the quantitative analysis using the WDS analysis and on the set analysis target elements. The electrooptical conditions are conditions for the electrooptical system 10, and include an acceleration voltage for the electron beam EB, a probe current, a probe diameter, and a measurement time.

For example, when the analysis target elements include a light element, the acceleration voltage is set to a low acceleration voltage (e.g., 5 kV) and, when the analysis target elements include no light element, the acceleration voltage is set to a high acceleration voltage (e.g., 15 kV).

The probe current is a current flowing in the electron probe applied to the specimen. When the specimen to be analyzed is made of a material susceptible to the electron beam damage, the control unit 60 sets the probe current small and, when the specimen to be analyzed is made of a material immune to the electron beam damage, the control unit 60 sets the probe current large. Whether or not the specimen to be analyzed is susceptible to the electron beam damage is determined, e.g., in a manner wherein the material of the specimen is estimated from the result of the quantitative analysis, and determination is made based on whether or not the estimated material corresponds to any of the preliminarily stored materials susceptible to the electron beam damage. For example, when the estimated material is a metal material, the control unit 60 determines that the specimen is immune to the electron beam damage, and sets the probe current large.

Meanwhile, when the specimen is made of the material susceptible to the electron beam damage, the control unit 60 sets the probe diameter large to reduce a current density.

For example, the control unit 60 sets the measurement time based on a measurement time input thereto by the user via the operation unit 70. In the WDS analysis, when measurement accuracy is pursued, the measurement time is increased and, when the measurement time is short, analysis accuracy deteriorates. Accordingly, the user sets the measurement time by determining, e.g., the priorities of the measurement accuracy and the measurement time.

Note that the user may also set the measurement time by estimating respective signal intensities of the analysis target elements based on the results of quantitative analysis by an XRF and X-ray intensity data such as standard sensitivity data for each of the spectroscopic elements so as to provide the signal intensity which allows the required measurement accuracy to be obtained.

1.3. Effects

In the analyzer 100, the control unit 60 performs the processing step of acquiring the analysis result of the preparatory analysis performed on the specimen to be analyzed by using the XRF 80, the processing step of setting the spectroscopic conditions for the WDS analysis using the WDSs 50*a*, 50*b*, 50*c*, 50*d*, and 50*e* based on the analysis result of the preparatory analysis, and the processing step of performing the WDS analysis under the spectroscopic conditions set for the specimen to be analyzed. Thus, in the analyzer 100, the control unit 60 sets the spectroscopic conditions for the WDS analysis based on the analysis result of the preparatory analysis. Accordingly, the analyzer 100 can easily perform the WDS analysis.

Since the XRF analysis is X-ray-excited, an amount of a generated continuous X-ray is smaller and background is lower than in electron-beam-excited EDS or the like. Accordingly, in the XRF analysis, high-sensitivity analysis can be performed in a shorter period of time. In addition, in the XRF analysis, the elements contained in a region to be subjected to the mapping analysis using the WDS can simultaneously be detected. Thus, in the XRF analysis, trace elements can be measured in a short period of time. Accordingly, even the constituent elements of the specimen are unknown, by performing the XRF analysis as the preparatory analysis and setting the spectroscopic conditions based on the analysis result of the preparatory analysis, it is possible to perform the WDS analysis without missing the trace elements.

For example, when qualitative analysis using the WDS analysis is performed as the preparatory analysis on an unknown specimen, analysis conditions are set based on the analysis result of the preparatory analysis, and the mapping analysis using the WDS analysis is performed, in the WDS analysis performed as the preparatory analysis, the qualitative analysis is required to be performed using all the elements as targets, which requires long-period measurement.

By contrast, in the analyzer 100, as described above, the XRF analysis is performed as the preparatory analysis, and consequently the preparatory analysis can be performed in a shorter period of time, and the WDS analysis can be performed without missing even the trace elements.

The analyzer 100 includes the database 2 that stores, for each type of the specimen, the information on the elements included in the specimen and the information on the concentrations of the elements included in the specimen. In the processing step of setting the spectroscopic conditions, the analyzer 100 searches the database 2 to extract the specimen having the result highly similar to the result of the quantitative analysis using the XRF analysis, acquire the information on the elements included in the extracted specimen from the database 2, set the elements included in the extracted specimen as the analysis target elements, and set the spectroscopic conditions based on the information on the analysis target elements. In addition, the database 2 includes, as the information on the elements included in the specimen, the elements which cannot be detected in the preparatory analysis, but can be detected in the WDS analysis. Therefore, as described above, it is possible to set even the minute amounts of the light elements that are hard to detect in the XRF analysis as the analysis target elements.

In the analyzer 100, when the number of the analysis target elements is larger than the number of the simultaneously measurable elements, the control unit 60 performs the processing step of setting the order in which the analysis target elements are to be measured based on the result of the preparatory analysis. This allows the measurement order to be set such that, for example, those of the analysis target elements which are more susceptible to the electron beam damage are measured earlier, and can reduce the influence of the electron beam damage.

In the analyzer 100, the control unit 60 performs the processing step of setting the conditions for the electrooptical system 10 in the WDS analysis based on the analysis result of the preparatory analysis. This allows the analyzer 100 to set the analysis conditions based on the analysis result of the XRF analysis and perform the WDS analysis. In other words, the analyzer 100 can automatically set the analysis conditions and perform the WDS analysis.

1.4. Modifications

Next, a description will be given of modifications of the analyzer according to the first embodiment. A description will be given below of portions different from those in the example of the analyzer 100 described above, and a description of the same portions is omitted.

1.4.1. First Modification

In the embodiment described above, the control unit 60 searches the database 2 in the processing step of setting the analysis target elements to extract the specimen having the result highly similar to the result of the quantitative analysis using the XRF analysis and set the analysis target elements.

By contrast, the control unit 60 may also set the elements detected in the XRF analysis as the analysis target elements. For example, the control unit 60 may also set all the elements detected in the XRF analysis as the analysis target elements.

Alternatively, the control unit 60 may also acquire the analysis result of the XRF analysis from the XRF 80 and cause the display unit 72 to display a list indicating all the elements detected in the XRF analysis and the concentrations of the elements as a list of candidates for the analysis target elements. At this time, the control unit 60 may also categorize the elements based on the concentrations thereof and cause the display unit 72 to display the categorized elements. For example, it may also be possible to represent a result of the categorization based on the concentrations using different colors such that, e.g., the high-concentration elements are displayed in red, the low-concentration elements are displayed in blue, and the intermediate-concentration elements are displayed in yellow. The list may also show elements in the periodic table in different colors based on the result of the categorization based on the concentrations.

When the user selects the elements from the list via the operation unit 70, the control unit 60 sets the selected elements as the analyzation target elements. The control unit 60 may also notify, based on the analysis result of the XRF analysis, the user of the elements which are included in a database storing therein previous analysis conditions and frequently attract attention.

It may also be possible to preliminarily exclude elements included in a holding material or a coating agent of the specimen from the list of the candidates for the analysis target elements.

1.4.2. Second Modification

Figure 5:
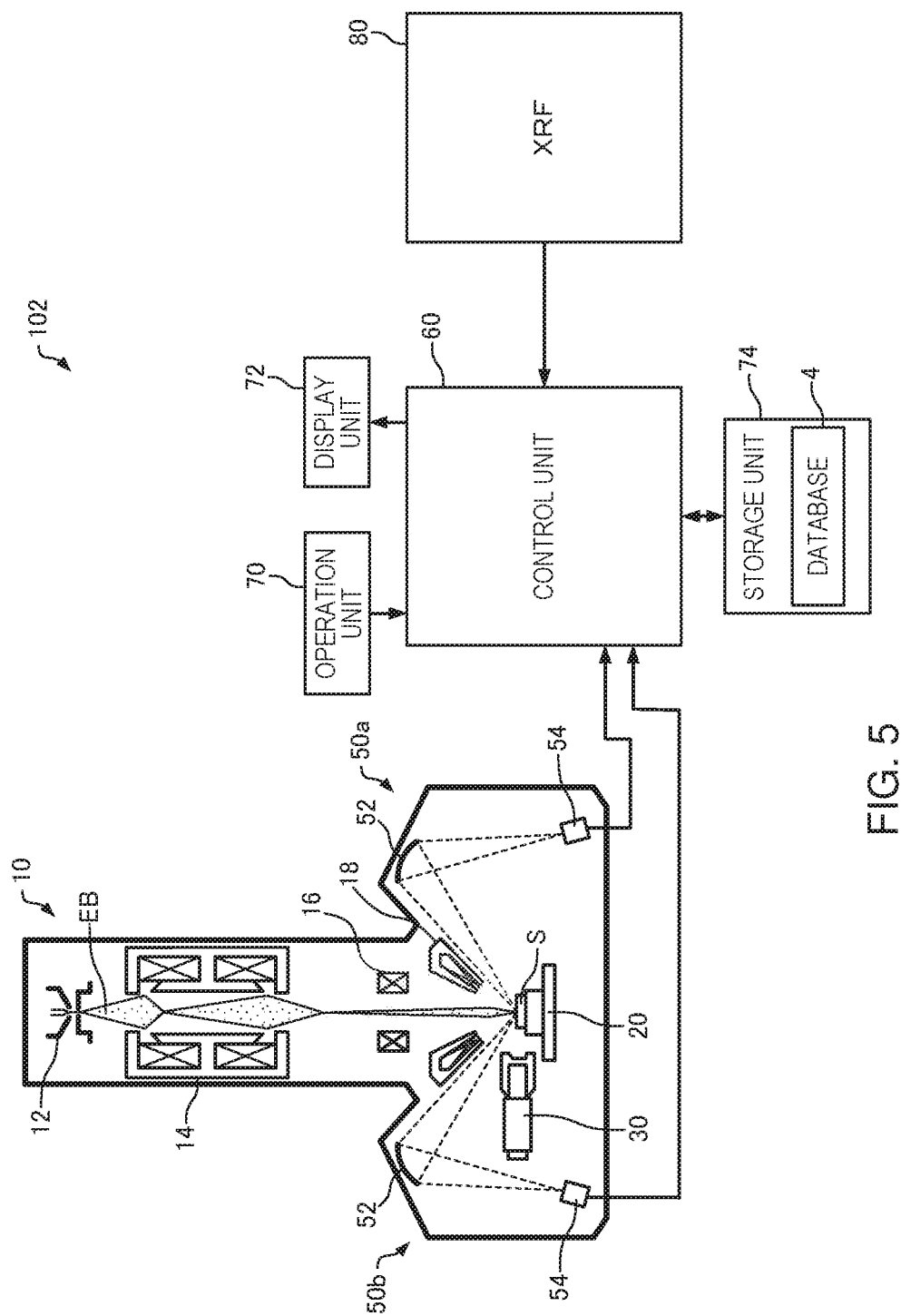
FIG. 5 is a diagram illustrating a configuration of an analyzer according to a second modification of the first embodiment.

FIG. 5 is a diagram illustrating a configuration of an analyzer 102 according to a second modification.

As illustrated in FIG. 5, in the analyzer 102, the storage unit 74 has a database 4. The database 4 stores, for each type of the specimen, the information on the elements included in the specimen, the information on the concentrations of the elements included in the specimen, and information on analysis conditions for the specimen.

FIG. 6 is a table for illustrating the database 4.

As illustrated in FIG. 6, the database 4 is different from the database 2 in that the database 4 includes the information on the analysis conditions for the specimen. The analysis conditions for the specimen include the spectroscopic conditions and the electrooptical conditions.

In an example illustrated in FIG. 6, as the spectroscopic conditions, the use of "LDE" as the spectroscopic element 52 of "WDS 1", i.e., the WDS 50a and the use of "TAP" as the spectroscopic element 52 of "WDS 2", i.e., the WDS 50b is stored. For the WDS 50c, the WDS 50d, and WDS 50e also, the types of the spectroscopic elements 52 to be used in respective analyses are similarly stored, though the illustration thereof is omitted in FIG. 6.

In the example illustrated in FIG. 6, an acceleration voltage of 15 kV and a probe current of 20 nA are also stored as the electrooptical conditions. Other electrooptical conditions, such as the measurement time, are also stored, though the illustration thereof is omitted in FIG. 6.

The analysis conditions stored in the database 4 may also be, e.g., analysis conditions when the specimen is measured in the analyzer 102. The analysis conditions stored in the database 4 may also be updated by machine learning or the like.

In the processing step of setting the analysis conditions, the control unit 60 searches the database 4 to extract the specimen having the result highly similar to the result of the quantitative analysis using the XRF analysis and acquire the information on the analysis conditions for the extracted specimen from the database 4 from the database 4. The control unit 60 sets the acquired analysis conditions for the extracted specimen as the analysis conditions for the WDS analysis.

For example, as a result of the searching of the database 4, when the result of the quantitative analysis using the XRF analysis is most similar to concentrations of individual elements included in stainless steel, the control unit 60 acquires information on analysis conditions for the stainless steel from the database 4. Then, the control unit 60 sets the acquired information on the analysis conditions as the analysis conditions for the WDS analysis. The control unit 60 performs the WDS analysis on the specimen to be analyzed under the set analysis conditions.

As described above, in the analyzer 102, the control unit 60 searches the database 4 to extract the specimen having the result highly similar to the result of the quantitative analysis using the XRF analysis, acquire the information on the spectroscopic conditions for the extracted specimen from the database 4, and set the spectroscopic conditions. Therefore, the analyzer 102 can achieve the same functions/effects as those achieved by the analyzer 100.

1.4.3. Third Modification

Figure 7:
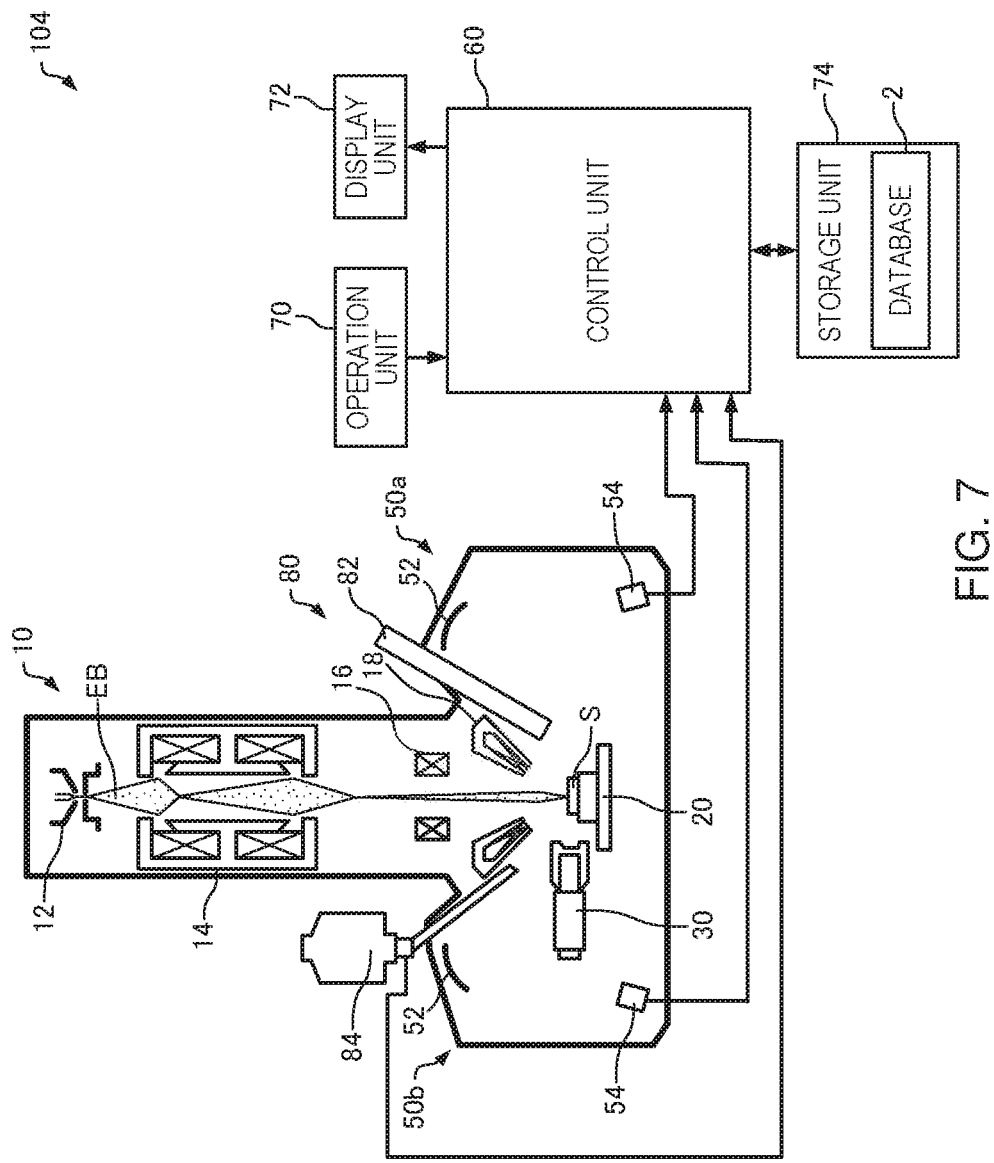
FIG. 7 is a diagram illustrating a configuration of an analyzer according to a third modification of the first embodiment.

FIG. 7 is a diagram illustrating a configuration of an analyzer 104 according to a third modification.

As illustrated in FIG. 7, the analyzer 104 includes the XRF 80. The XRF 80 includes an X-ray gun 82 serving as an X-ray source which applies an X-ray to the specimen S and an X-ray detector 84 which detects a fluorescence X-ray generated by applying the X-ray to the specimen S. The X-ray gun 82 is disposed in a specimen chamber in which the specimen S is contained. For example, the X-ray detector 84 is an energy-dispersive X-ray detector. An output signal from the X-ray detector 84 is transmitted to the control unit 60. The control unit 60 acquires the output signal from the X-ray detector 84 to acquire the analysis result of the XRF analysis.

The analyzer 104 can perform the XRF analysis with any timing.

2. Second Embodiment

2.1. Analyzer

Figure 8:
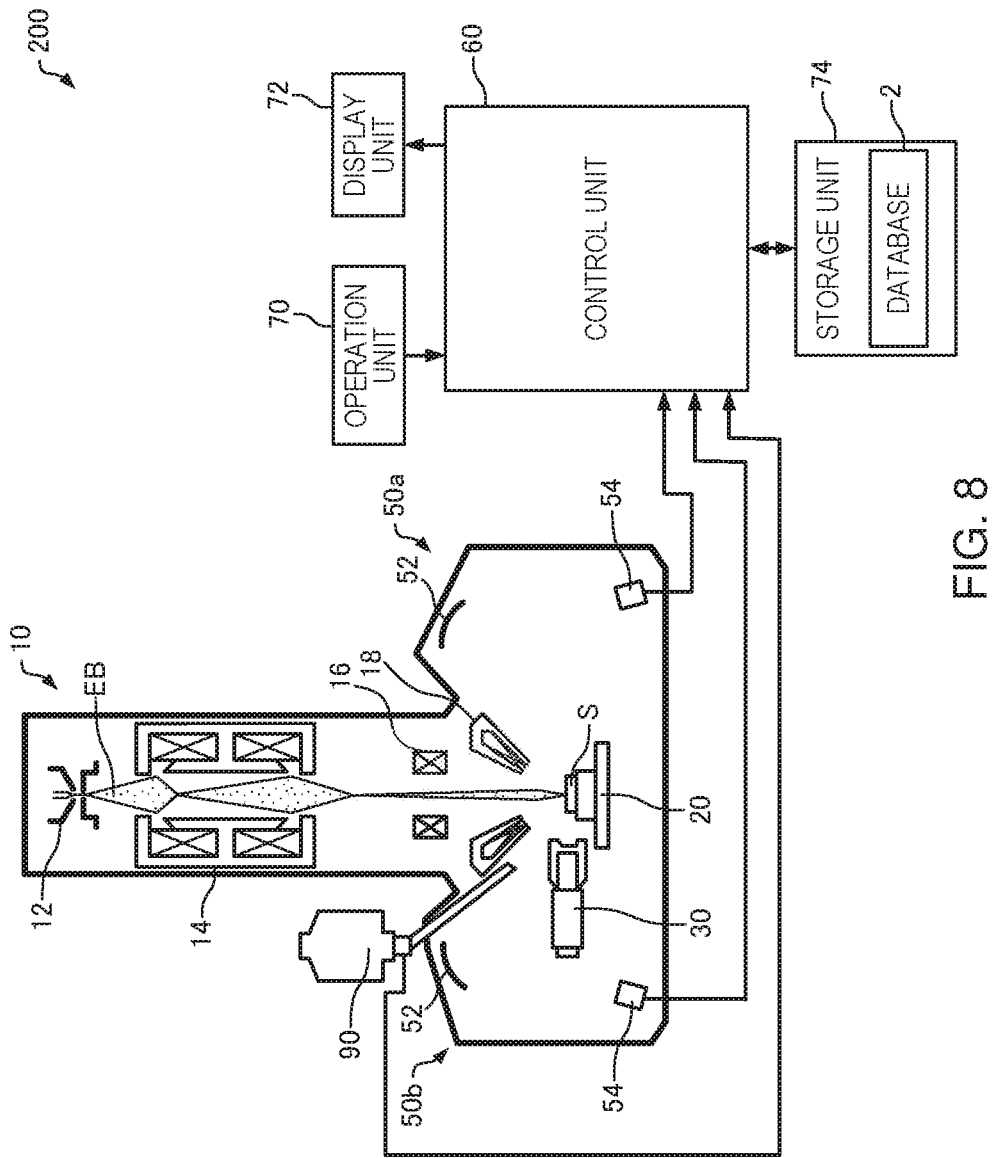
FIG. 8 is a diagram illustrating a configuration of an analyzer according to a second embodiment.

Next, a description will be given of an analyzer according to a second embodiment. FIG. 8 is a diagram illustrating a configuration of an analyzer 200 according to the second embodiment. In the analyzer 200 according to the second embodiment, members having the same functions as those of the constituent members of the analyzer 100 according to the first embodiment are hereinafter denoted by the same reference numerals, and a detailed description thereof is omitted.

As illustrated in FIG. 8, the analyzer 200 includes an energy-dispersive X-ray spectrometer (EDS) 90. The EDS 90 detects a characteristic X-ray generated by applying the electron beam EB to the specimen S. The EDS 90 discriminates the characteristic X-ray based on energy, and outputs EDS spectrum data.

The control unit 60 controls the electrooptical system 10 and the EDS 90. The control unit 60 controls the electrooptical system 10 and the EDS 90 to perform EDS analysis. The control unit 60 controls the electrooptical system 10 and the EDS 90 based on set analysis conditions for the EDS analysis. As a result, the electron beam EB is applied to a specified region of the specimen S, and the EDS 90 can detect the characteristic X-ray emitted from the specimen S. The control unit 60 acquires an output signal from the EDS 90 to generate an EDS spectrum. The control unit 60 also performs qualitative analysis and quantitative analysis based on the generated EDS spectrum.

2.2. Processing

2.2.1. Flow of Processing in Control Unit

Next, a description will be given of processing performed in the control unit 60 of the analyzer 200. A description will be given below of portions different from those in the processing performed in the control unit 60 of the analyzer 100 described above, and a description of the same portions is omitted.

A user observes a SEM image of the specimen in the analyzer 200 and sets an analysis method and an analysis region. Next, when the user inputs an instruction to start WDS analysis to the analyzer 200 via the operation unit 70, the control unit 60 starts processing for performing the WDS analysis.

Figure 9:
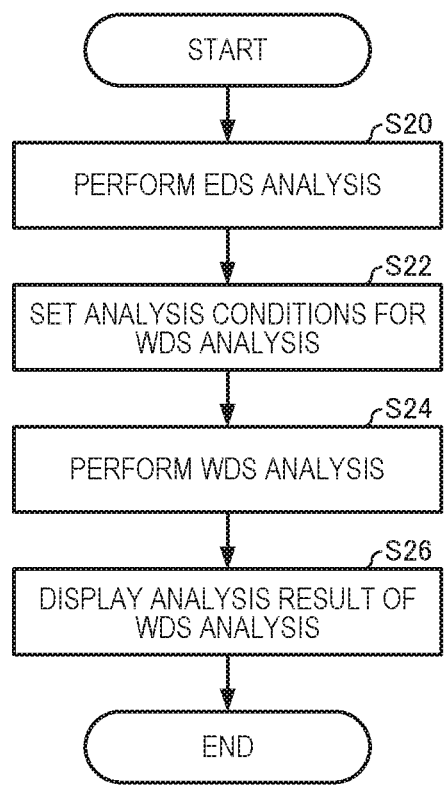
FIG. 9 is a flow chart illustrating an example of processing performed in a control unit of the analyzer according to the second embodiment.

FIG. 9 is a flow chart illustrating an example of the processing performed in the control unit 60 of the analyzer 200.

The control unit 60 controls the electrooptical system 10 and the EDS 90 to perform EDS analysis (S20). As a result, the electron beam EB is applied to the specimen serving as an analysis target, and the EDS 90 can detect the characteristic X-ray generated from the specimen S. The control unit 60 acquires the output signal from the EDS 90 to generate the EDS spectrum, and performs the qualitative analysis and the quantitative analysis thereon. This allows respective results of the qualitative analysis and the quantitative analysis each using the EDS analysis to be acquired as a result of preparatory analysis. The result of the quantitative analysis is information on respective concentrations of individual elements included in the specimen. Note that the result of the quantitative analysis may also be a relative intensity (K-ratio) of an X-ray which can be converted to the concentrations of the individual elements included in the specimen.

When, e.g., mapping analysis is set as an analysis method for the WDS analysis, in the preparatory analysis, point analysis is performed a plurality of times at different positions in a region to be subjected to the mapping analysis. By performing the point analysis the plurality of times, even when portions having different compositions are present in the region to be subjected to the mapping analysis, all analysis target elements can be set. Regions to be subjected to the point analysis may also be outside the region to be subjected to the mapping analysis. As the preparatory analysis, line analysis or mapping analysis may also be performed.

Note that the control unit 60 may also perform the EDS analysis in parallel while performing the SEM observation of the specimen to be analyzed. In other words, the control unit 60 may also simultaneously perform the SEM observation for recognizing analysis positions or the like and the EDS analysis serving as the preparatory analysis.

Next, the control unit 60 sets analysis conditions for the WDS analysis based on the analysis result of the EDS analysis (S22). Next, the control unit 60 performs the WDS analysis on the specimen to be analyzed under the set analysis conditions (S24). The control unit 60 causes the display unit 72 to display an analysis result of the WDS analysis obtained by performing the WDS analysis (S26).

2.2.2. Setting of Analysis Conditions

Next, a description will be given of a processing step (S22) of setting the analysis conditions for the WDS analysis. The control unit 60 sets the analysis conditions for the WDS analysis based on the analysis result of the EDS analysis.

(1) Setting of Analysis Target Elements

The control unit 60 searches the database 2 to extract a specimen having a result highly similar to the result of the quantitative analysis using the EDS analysis, acquire information on elements included in the extracted specimen from the database 2, and set the analysis target elements.

(2) Setting of Spectroscopic Conditions

A processing step of setting spectroscopic conditions is the same as the processing step performed by the control unit 60 described above in "(2) Setting of Spectroscopic Conditions" in "1.2.2. Setting of Analysis Conditions", and a description thereof is omitted.

(3) Setting of Electrooptical Conditions

A processing step of setting electrooptical conditions is the same as the processing step performed by the control unit 60 described above in "(3) Setting of Electrooptical Conditions" in "1.2.2. Setting of Analysis Conditions", and a description thereof is omitted.

2.3. Effects

In the analyzer 200, the control unit 60 performs a processing step of acquiring an analysis result of the preparatory analysis performed on the specimen to be analyzed by using the EDS 90, a processing step of setting spectroscopic conditions for the WDS analysis using the WDSs 50a, 50b, 50c, 50d, and 50e based on the analysis result of the preparatory analysis, and a processing step of performing the WDS analysis on the specimen to be analyzed under the set spectroscopic conditions. Thus, in the analyzer 200, the control unit 60 sets the spectroscopic conditions for the WDS analysis based on the analysis result of the preparatory analysis. Accordingly, the analyzer 200 can easily perform the WDS analysis, similarly to the analyzer 100 described above.

It is to be noted herein that, in the EDS analysis, measurement can be performed in a shorter period of time than in the WDS analysis. Accordingly, even the constituent elements of the specimen are unknown, by performing the EDS analysis as the preparatory analysis and setting the spectroscopic conditions based on the analysis result of the preparatory analysis, it is possible to perform preparatory measurement in a shorter period of time.

The analyzer 200 includes the database 2 that stores, for each type of the specimen, the information on the elements included in the specimen and the information on the concentrations of the elements included in the specimen. In the processing step of setting the spectroscopic conditions, the analyzer 200 searches the database 2 to extract the specimen having the result highly similar to the result of the quantitative analysis using the EDS analysis, acquire the information on the elements included in the extracted specimen from the database 2, set the elements included in the extracted specimen as the analysis target elements, and set the spectroscopic conditions based on the information on the analysis target elements. In addition, the database 2 includes, as the information on the elements included in the specimen, the elements which cannot be detected in the preparatory analysis, but can be detected in the WDS analysis. Therefore, it is possible to set even the minute amounts of the light elements that are hard to detect in the EDS analysis as the analysis target elements.

2.4. Modifications

Next, a description will be given of modifications of the analyzer according to the second embodiment. A description will be given below of portions different from those in the example of the analyzer 200 described above, and a description of the same portions is omitted.

2.4.1. First Modification

In the embodiment described above, the control unit 60 searches the database 2 in the processing step of setting the analysis target elements to extract the specimen having the result highly similar to the analysis result of the quantitative analysis using the EDS analysis and set the analysis target elements.

By contrast, the control unit 60 may also set the elements detected in the EDS analysis as the analysis target elements. For example, the control unit 60 may also set all the elements detected in the EDS analysis as the analysis target elements.

Alternatively, the control unit 60 may also acquire the analysis result of the EDS analysis and causes the display unit 72 to display a list indicating all the elements detected in the EDS analysis and the concentrations of the elements as a list of candidates for the analysis target elements. When the user selects the elements from the list via the operation unit 70, the control unit 60 sets the selected elements as the analyzation target elements.

2.4.2. Second Modification

Figure 10:
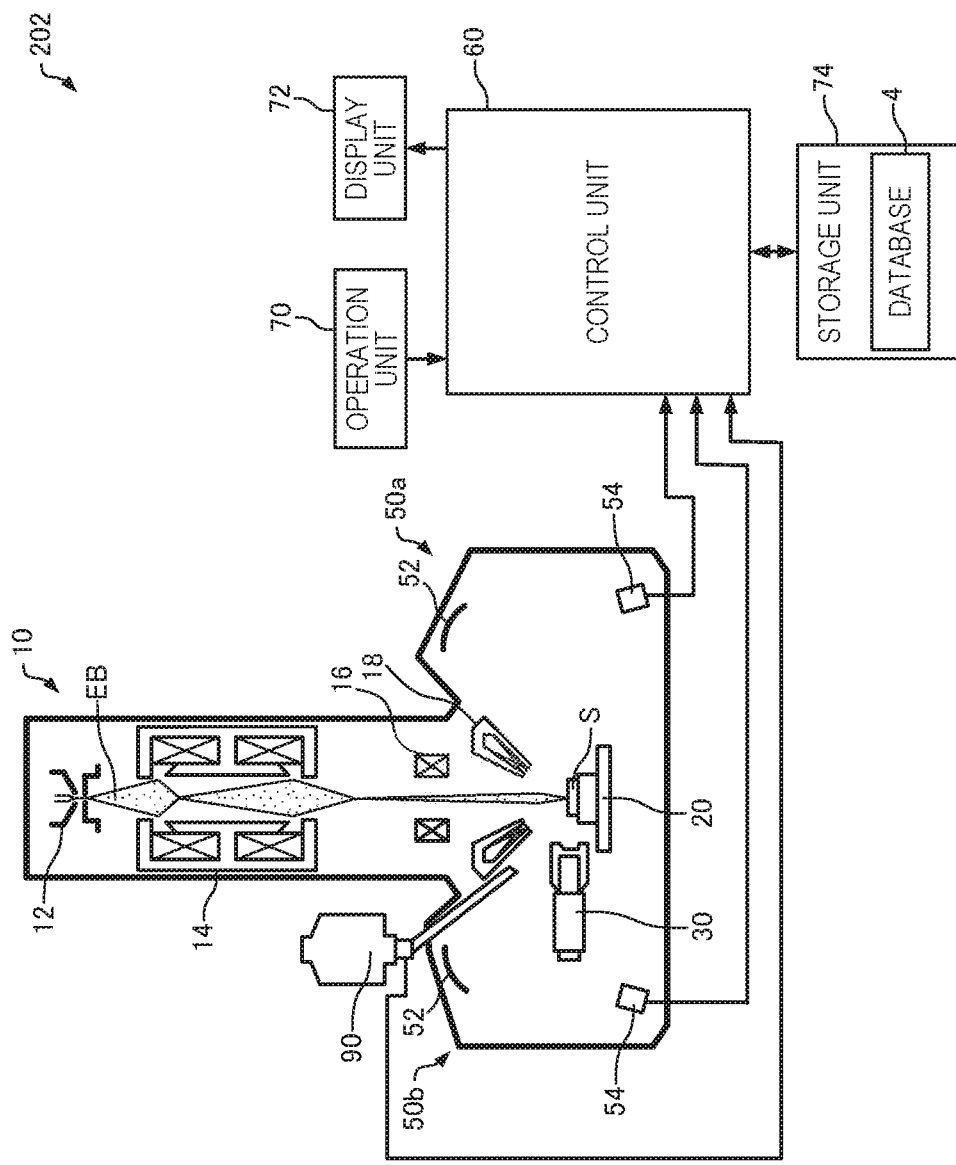
FIG. 10 is a diagram illustrating a configuration of an analyzer according to a second modification of the second embodiment.

FIG. 10 is a diagram illustrating a configuration of an analyzer 202 according to a second modification.

As illustrated in FIG. 10, in the analyzer 202, the storage unit 74 has the database 4. The database 4 stores, for each type of the specimen, the information on the elements included in the specimen, the information on the concentrations of the elements included in the specimen, and information on analysis conditions for the specimen.

In the processing step of setting the analysis conditions, the control unit 60 searches the database 4 illustrated in FIG. 6 to extract the specimen having the result highly similar to the result of the quantitative analysis using the EDS analysis and acquire the information on the analysis conditions for the extracted specimen from the database 4. The control unit 60 sets the acquired analysis conditions for the extracted specimen as the analysis conditions for the WDS analysis.

In the analyzer 202, the control unit 60 searches the database 4 to extract the specimen having the result highly similar to the result of the quantitative analysis using the EDS analysis, acquire the information on the spectroscopic conditions for the extracted specimen from the database 4, and set the spectroscopic conditions. Therefore, the analyzer 202 can achieve the same functions/effects as those achieved by the analyzer 200.

3. Third Embodiment 3.1. Analyzer

Figure 11:
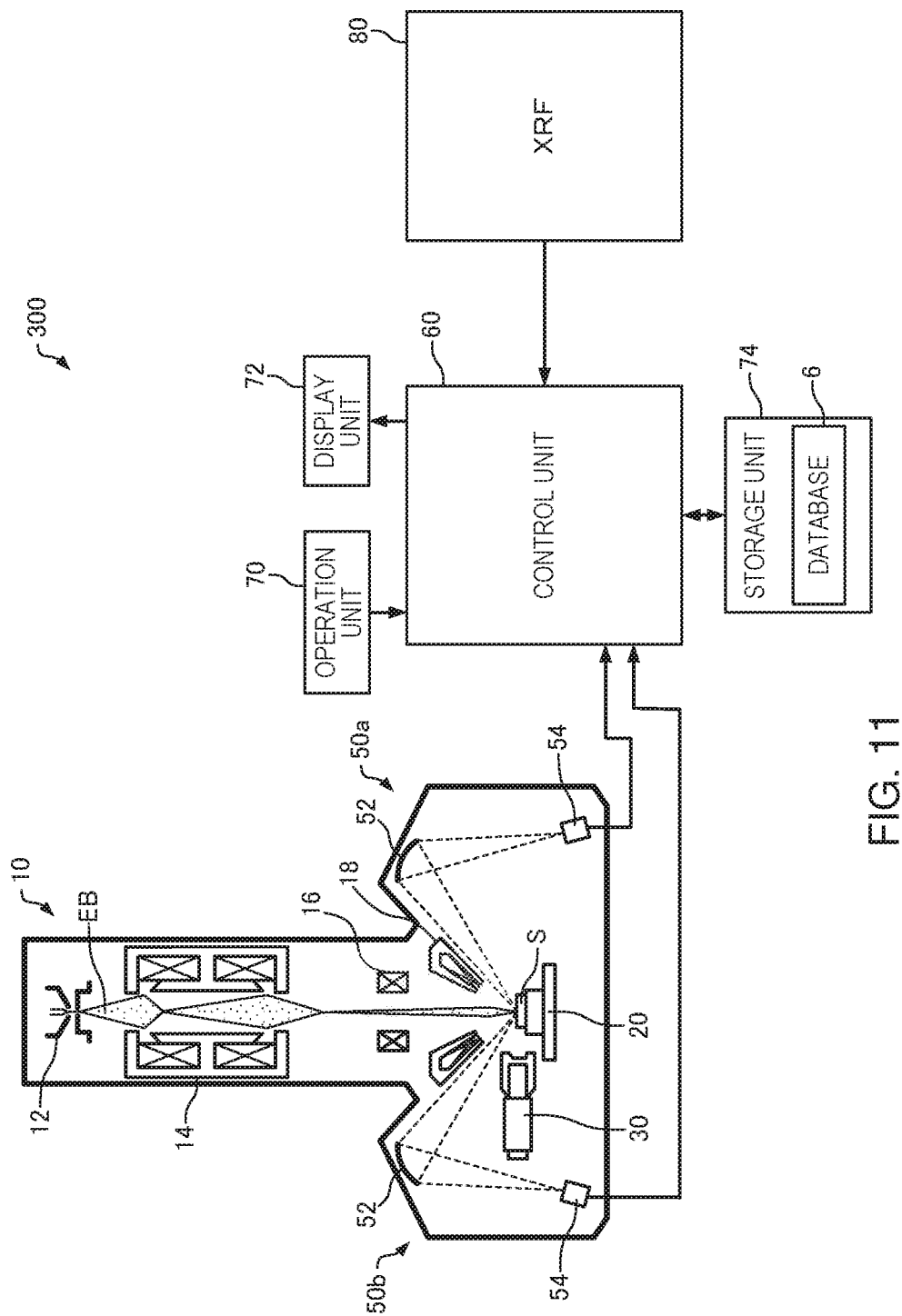
FIG. 11 is a diagram illustrating a configuration of an analyzer according to a third embodiment.

Next, a description will be given of an analyzer according to a third embodiment. FIG. 11 is a diagram illustrating a configuration of an analyzer 300 according to the third embodiment. In the analyzer 300 according to the third embodiment, members having the same functions as those of the respective constituent members of the analyzer 100 according to the first embodiment and the analyzer 200 according to the second embodiment are hereinafter denoted by the same reference numerals, and a detailed description thereof is omitted.

In the analyzer 100 described above, as illustrated in FIG. 1, the storage unit 74 has the database 2 that stores, for each type of the specimen, the information on the elements included in the specimen and the information on the concentrations of the elements included in the specimen.

By contrast, in the analyzer 300, as illustrated in FIG. 11, the storage unit 74 has a database 6. The database 6 stores, for each type of a specimen, information on elements included in the specimen and information on an XRF spectrum of the specimen.

Figure 12:
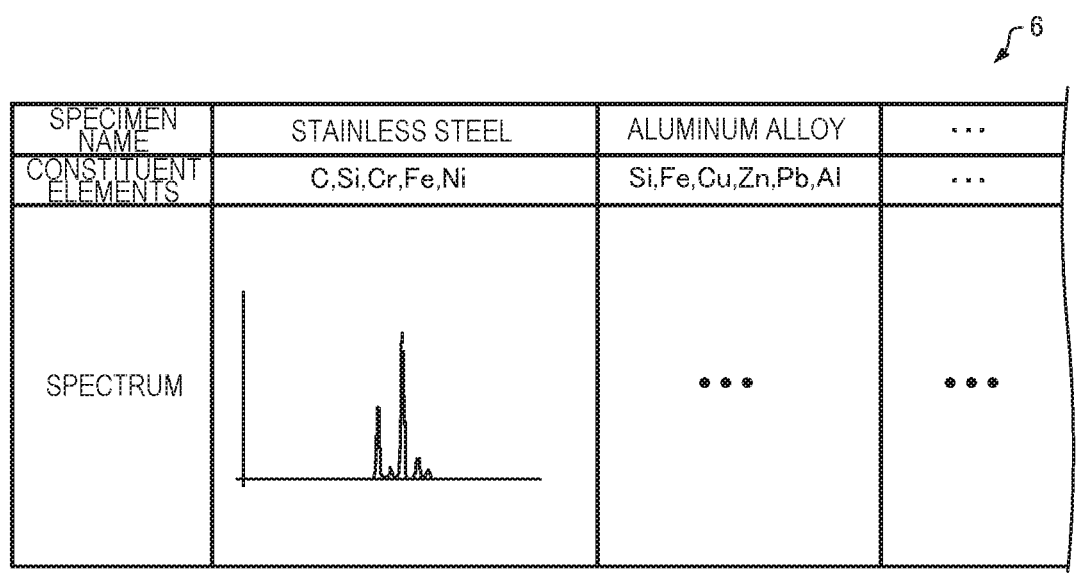
FIG. 12 is a table for illustrating a database.

FIG. 12 is a table for illustrating the database 6.

As illustrated in FIG. 12, the database 6 stores a specimen name indicating the type of the specimen, the information on the elements included in the specimen, and the information on the XRF spectrum of the specimen.

For example, in the database 6, stainless steel is stored as the specimen name, C, Si, Cr, Fe, and Ni are stored as the elements included in the specimen, and an XRF spectrum of the stainless steel illustrated in FIG. 12 is stored as the spectrum. The XRF spectrum stored in the database 6 may also be, e.g., the XRF spectrum obtained as a result of measuring the specimen using the XRF 80.

3.2. Processing

3.2.1. Flow of Processing in Control Unit

When WDS analysis is performed using the analyzer 300, first, XRF analysis is performed using the XRF 80 on a specimen to be analyzed to thereby perform preparatory analysis. Thus, it is possible to obtain the XRF spectrum of the specimen to be analyzed.

Next, a user observes a SEM image of the specimen in the analyzer 300 and sets an analysis method and an analysis region. Next, when the user inputs an instruction to start the WDS analysis to the analyzer 300 via the operation unit 70, the control unit 60 starts processing for performing the WDS analysis.

The processing performed in the control unit 60 of the analyzer 300 is the same as the processing performed in the control unit 60 of the analyzer 100 illustrated in FIG. 3 described above except for the processing step (S12) of setting analysis conditions for the WDS analysis. A description will be given below of portions different from those in the processing performed in the control unit 60 of the analyzer 100 illustrated in FIG. 3, and a description of the same portions is omitted.

3.2.2. Setting of Analysis Conditions (1) Setting of Analysis Target Elements The control unit 60 searches the database 6 to extract a specimen having an XRF spectrum highly similar to the XRF spectrum of the specimen to be analyzed, acquire information on elements included in the extracted specimen from the database 6, and set analysis target elements.

For example, when the XRF spectrum of the specimen to be analyzed is most similar to the XRF spectrum of the stainless steel as a result of the searching of the database 6, the control unit 60 acquires information on elements included in the stainless steel from the database 6. Then, the control unit 60 sets the acquired elements included in the stainless steel as the analysis target elements. Specifically, the control unit 60 sets C, Si, Cr, Fe, and Ni illustrated in FIG. 12 as the analysis target elements.

(2) Setting of Spectroscopic Conditions

A processing step of setting spectroscopic conditions is the same as the processing step performed by the control unit 60 described above in "(2) Setting of Spectroscopic Conditions" in "1.2.2. Setting of Analysis Conditions", and a description thereof is omitted.

(3) Setting of Electrooptical Conditions

A processing step of setting electrooptical conditions is the same as the processing step performed by the control unit 60 described above in "(3) Setting of Electrooptical Conditions" in "1.2.2. Setting of Analysis Conditions", and a description thereof is omitted.

3.3. Effects

The analyzer 300 includes the database 6 that stores, for each type of the specimen, the information on the XRF spectrum of the specimen, and an analysis result of the XRF analysis performed as the preparatory analysis includes the XRF spectrum of the specimen to be analyzed. In the processing step of setting the spectroscopic conditions, the control unit 60 searches the database 6 to extract the specimen having the XRF spectrum highly similar to the XRF spectrum of the specimen to be analyzed, acquire the information on the elements included in the extracted specimen, and set the elements included in the extracted specimen as the analysis target elements. Next, the control unit 60 sets the spectroscopic conditions based on the set analysis target elements. Thus, in the analyzer 300, the control unit 60 sets the spectroscopic conditions for the WDS analysis based on the analysis result of the preparatory analysis. Accordingly, similarly to the analyzer 100 described above, the analyzer 300 can easily perform the WDS analysis.

3.4. Modifications

Next, a description will be given of a modification of the analyzer according to the third embodiment. A description will be given below of portions different from those in the example of the analyzer 300 described above, and a description of the same portions is omitted.

Figure 13:
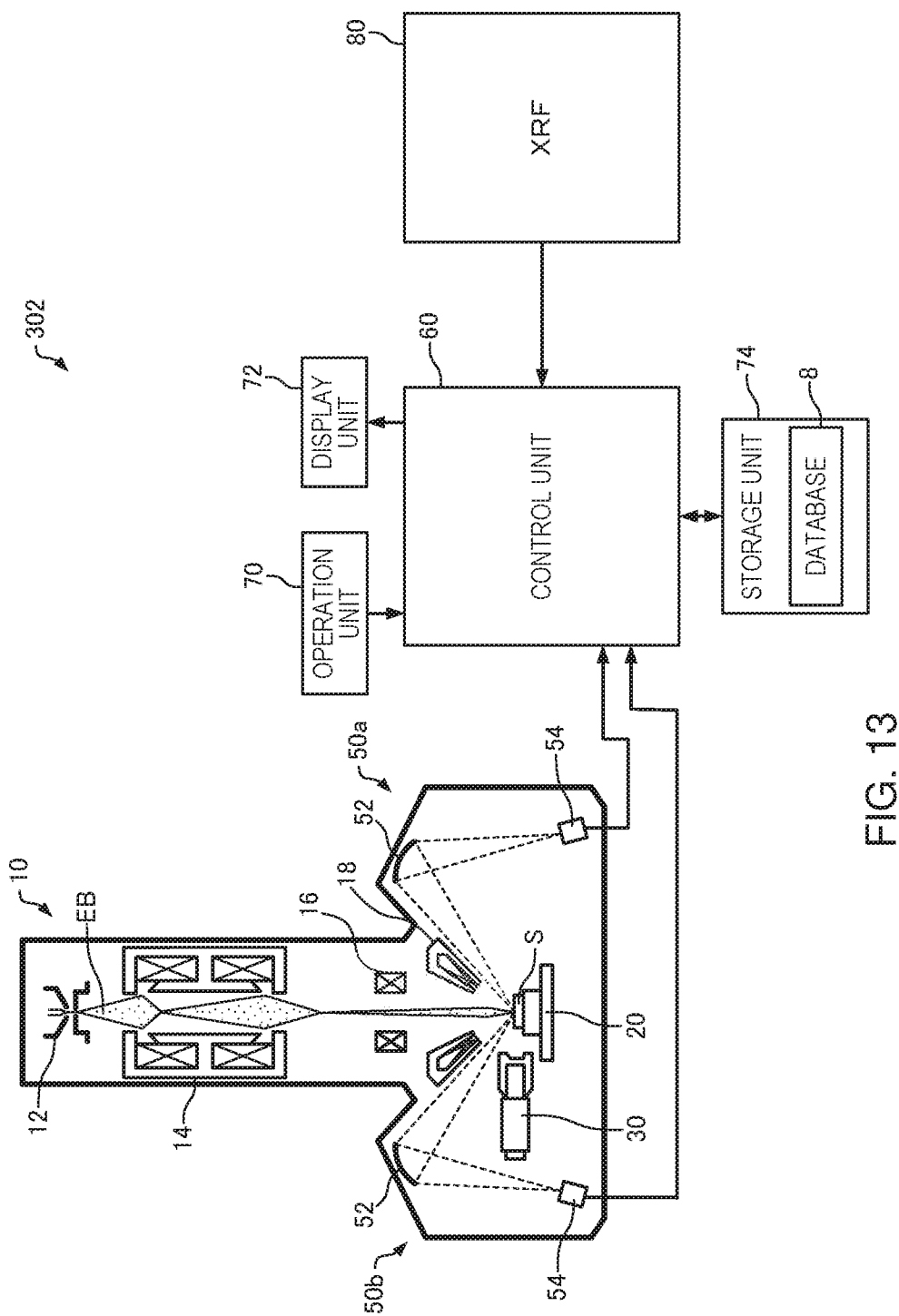
FIG. 13 is a diagram illustrating a configuration of an analyzer according to a modification of the third embodiment.

FIG. 13 is a diagram illustrating a configuration of an analyzer 302 according to the modification of the third embodiment.

As illustrated in FIG. 13, in the analyzer 302, the storage unit 74 has a database 8. The database 8 stores, for each type of the specimen, the information on the elements included in the specimen, the information on the XRF spectrum of the specimen, and information on analysis conditions for the specimen.

Figure 14:
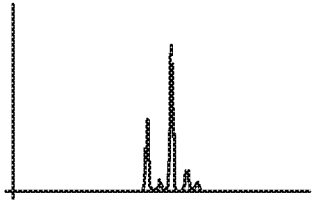
FIG. 14 is a table for illustrating a database.

FIG. 14 is a table for illustrating the database 8.

As illustrated in FIG. 14, the database 8 is different from the database 6 in that the database 8 includes the information on the analysis conditions for the specimen. The analysis conditions for the specimen include the spectroscopic conditions and the electrooptical conditions.

In the processing step of setting the analysis conditions, the control unit 60 searches the database 8 to extract the specimen having the spectrum highly similar to the XRF spectrum of the specimen to be analyzed and acquire the information on the analysis conditions for the extracted specimen from the database 8. The control unit 60 sets the acquired analysis conditions for the extracted specimen as the analysis conditions for the WDS analysis.

For example, as a result of the searching of the database 8, when the XRF spectrum of the specimen to be analyzed is most similar to the XRF spectrum of the stainless steel, the control unit 60 acquires analysis conditions for the stainless steel from the database 8. Then, the control unit 60 sets the acquired analysis conditions as the analysis conditions for the WDS analysis. The control unit 60 performs the WDS analysis on the specimen to be analyzed under the set analysis conditions.

In the analyzer 302, the control unit 60 searches the database 8 to extract the specimen having the XRF spectrum highly similar to the XRF spectrum of the specimen to be analyzed, acquire the information on the spectroscopic conditions for the extracted specimen from the database 8, and set the spectroscopic conditions. Therefore, the analyzer 302 can achieve the same functions/effects as those achieved by the analyzer 300.

4. Fourth Embodiment

4.1. Analyzer

Figure 15:
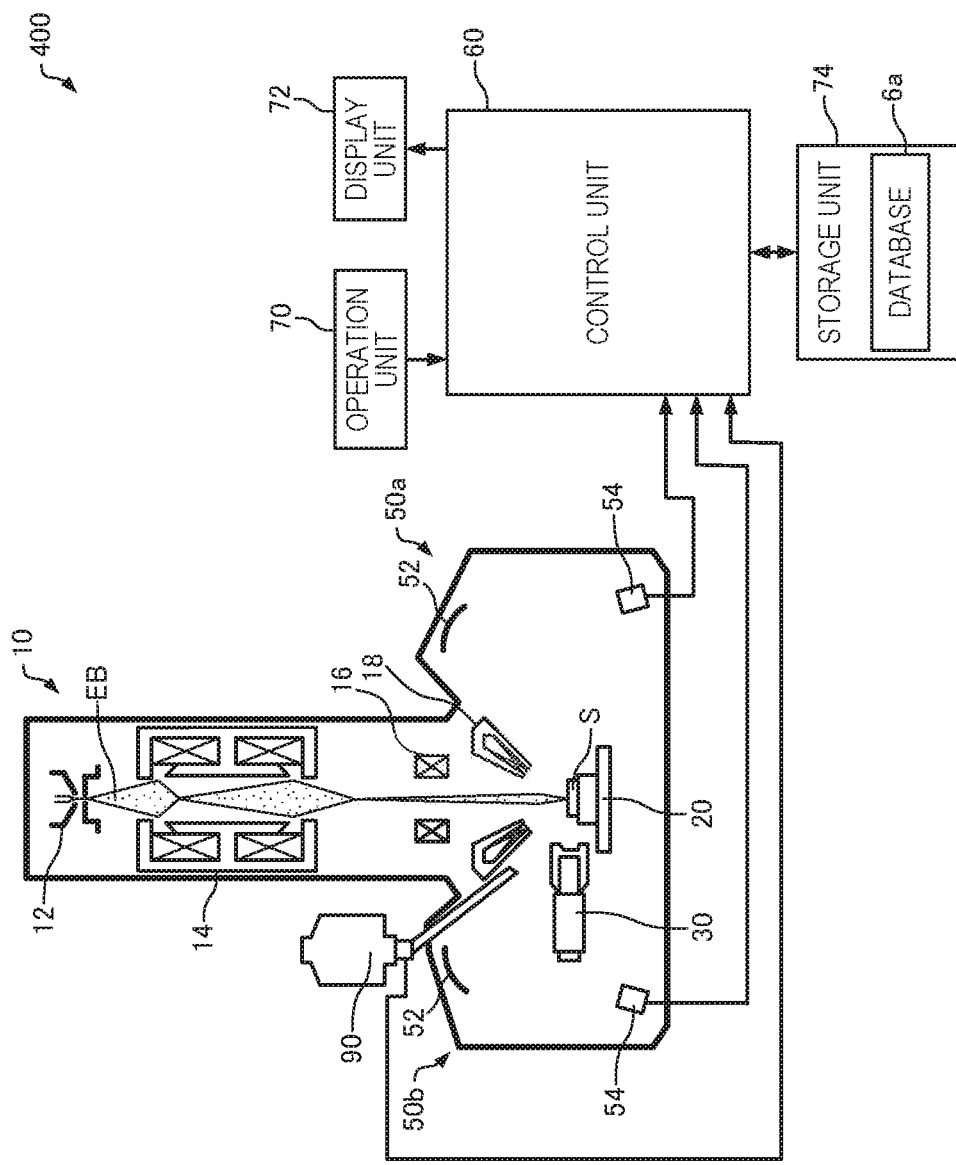
FIG. 15 is a diagram illustrating a configuration of an analyzer according to a fourth embodiment.

Next, a description will be given of an analyzer according to a fourth embodiment. FIG. 15 is a diagram illustrating a configuration of an analyzer 400 according to the fourth embodiment. In the analyzer 400 according to the fourth embodiment, members having the same functions as those of the respective constituent members of the analyzer 100 according to the first embodiment, the analyzer 200 according to the second embodiment, and the analyzer 300 according to the third embodiment are hereinafter denoted by the same reference numerals, and a detailed description thereof is omitted.

In the analyzer 200 described above, as illustrated in FIG. 8, the storage unit 74 has the database 2 that stores, for each type of the specimen, the information on the elements included in the specimen and the information on the concentrations of the elements included in the specimen.

By contrast, in the analyzer 400, as illustrated in FIG. 15, the storage unit 74 has a database 6a. The database 6a stores, for each type of a specimen, information on elements included in the specimen and information on an EDS spectrum of the specimen.

Figure 16:
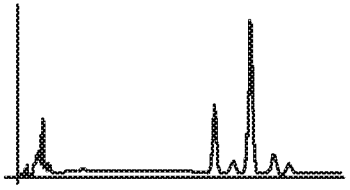
FIG. 16 is a table for illustrating a database.

FIG. 16 is a table for illustrating the database 6a.

As illustrated in FIG. 16, the database 6a stores a specimen name indicating the type of the specimen, the information on the elements included in the specimen, and the information on the EDS spectrum of the specimen.

For example, in the database 6a, stainless steel is stored as the specimen name, C, Si, Cr, Fe, and Ni are stored as the elements included in the specimen, and an EDS spectrum of the stainless steel illustrated in FIG. 16 is stored as the spectrum. The EDS spectrum stored in the database 6a may also be, e.g., the EDS spectrum obtained as a result of measuring the specimen using the analyzer 400.

4.2. Processing

4.2.1. Flow of Processing in Control Unit

Processing performed in the control unit 60 of the analyzer 400 is different from the processing performed in the control unit 60 of the analyzer 200 illustrated in FIG. 9 described above in that the EDS spectrum is acquired in the processing step of performing EDS analysis and analysis conditions for WDS analysis are set using the database 6a. A description will be given below of portions different from those in the processing performed in the control unit 60 of the analyzer 200 illustrated in FIG. 9, and a description of the same portions is omitted.

When the WDS analysis is performed using the analyzer 400, first, EDS analysis is performed using the EDS 90 on a specimen to be analyzed to thereby perform preparatory analysis. Thus, it is possible to obtain the EDS spectrum of the specimen to be analyzed.

4.2.2. Setting of Analysis Conditions (1) Setting of Analysis Target Elements The control unit 60 searches the database 6a to extract a specimen having an EDS spectrum highly similar to the EDS spectrum of the specimen to be analyzed, acquire information on elements included in the specimen of concern from the database 6a, and set analysis target elements.

For example, when the EDS spectrum of the specimen to be analyzed is most similar to the EDS spectrum of the stainless steel as a result of the searching of the database 6a, the control unit 60 acquires information on elements included in the stainless steel from the database 6a. Then, the control unit 60 sets the acquired elements included in the stainless steel as the analysis target elements.

(2) Setting of Spectroscopic Conditions

A processing step of setting spectroscopic conditions is the same as the processing step performed by the control unit 60 described above in "(2) Setting of Spectroscopic Conditions" in "1.2.2. Setting of Analysis Conditions", and a description thereof is omitted.

(3) Setting of Electrooptical Conditions

A processing step of setting electrooptical conditions is the same as the processing step performed by the control unit 60 described above in "(3) Setting of Electrooptical Conditions" in "1.2.2. Setting of Analysis Conditions", and a description thereof is omitted.

4.3. Effects

The analyzer 400 includes the database 6a that stores, for each type of the specimen, information on the EDS spectrum of the specimen, and an analysis result of the EDS analysis performed as the preparatory analysis includes the EDS spectrum of the specimen to be analyzed. In the processing step of setting the spectroscopic conditions, the control unit 60 searches the database 6a to extract the specimen having the EDS spectrum highly similar to the EDS spectrum of the specimen to be analyzed, acquire the information on the elements included in the extracted specimen, and set the elements included in the extracted specimen as the analysis target elements. Next, the control unit 60 sets the spectroscopic conditions based on the set analysis target elements. Thus, in the analyzer 400, the control unit 60 sets the spectroscopic conditions for the WDS analysis based on the analysis result of the preparatory analysis. Accordingly, similarly to the analyzer 100 described above, the analyzer 400 can easily perform the WDS analysis.

4.4. Modifications

Next, a description will be given of a modification of the analyzer according to the fourth embodiment. A description will be given below of portions different from those in the example of the analyzer 400 described above, and a description of the same portions is omitted.

Figure 17:
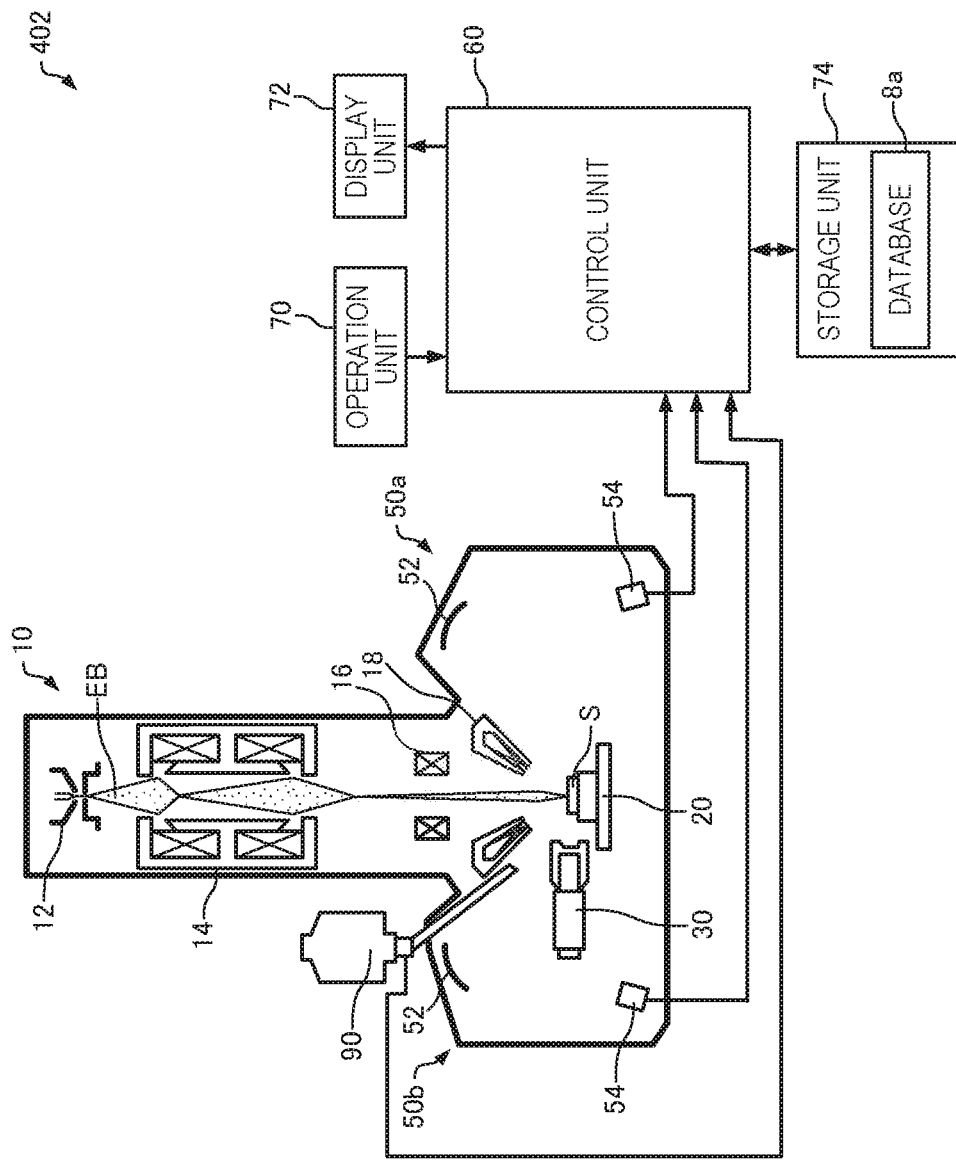
FIG. 17 is a diagram illustrating a configuration of an analyzer according to a modification of the fourth embodiment.

FIG. 17 is a diagram illustrating a configuration of an analyzer 402 according to the modification of the fourth embodiment.

As illustrated in FIG. 17, in the analyzer 402, the storage unit 74 has a database 8a. The database 8a stores, for each type of the specimen, the information on the elements included in the specimen, information on the EDS spectrum of the specimen, and information on analysis conditions for the specimen.

Figure 18:
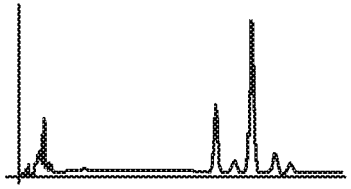
FIG. 18 is a table for illustrating a database.

FIG. 18 is a table for illustrating the database 8a.

As illustrated in FIG. 18, the database 8a is different from the database 6a in that the database 8a includes the information on the analysis conditions for the specimen. The analysis conditions for the specimen include the spectroscopic conditions and the electrooptical conditions.

In the processing step of setting the analysis conditions, the control unit 60 searches the database 8a to extract the specimen having the EDS spectrum highly similar to the EDS spectrum of the specimen to be analyzed and acquire the information on the analysis conditions for the extracted specimen from the database 8a. The control unit 60 sets the acquired analysis conditions for the extracted specimen as the analysis conditions for the WDS analysis.

For example, as a result of the searching of the database 8a, when the EDS spectrum of the specimen to be analyzed is most similar to the EDS spectrum of the stainless steel, the control unit 60 acquires analysis conditions for the stainless steel from the database 8a. Then, the control unit 60 sets the acquired information conditions as the analysis conditions for the WDS analysis. The control unit 60 performs the WDS analysis on the specimen to be analyzed under the set analysis conditions.

In the analyzer 402, the control unit 60 searches the database 8a to extract the specimen having the EDS spectrum highly similar to the EDS spectrum of the specimen to be analyzed, acquire the information on the spectroscopic conditions for the extracted specimen from the database 8a, and set the spectroscopic conditions. Therefore, the analyzer 402 can achieve the same functions/effects as those achieved by the analyzer 400.

The above-described embodiments and modifications are examples and the invention is not limited thereto. For example, the embodiments and the modifications may be combined appropriately.

The invention is not limited to the above-described embodiments, and various modifications can be made. For example, the invention includes configurations that are substantially the same as the configurations described in the embodiments. Substantially same configurations means configurations that are the same in function, method, and results, or configurations that are the same in objective and effects, for example. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An analyzer comprising:
a wavelength-dispersive X-ray spectrometer that is arranged to detect a characteristic X-ray generated from a specimen irradiated with an electron beam;
an X-ray fluorescence analyzer comprising an X-ray source configured to apply an X-ray to the specimen and an X-ray detector which detects a fluorescence X-ray generated by applying the X-ray to the specimen; and
a control unit that controls the wavelength-dispersive X-ray spectrometer,
the control unit configured to perform processing to:
perform a preparatory analysis of a specimen to be analyzed using the X-ray fluorescence analyzer without performing an analysis using the wavelength-dispersive X-ray spectrometer;
acquire an analysis result of the preparatory analysis performed on the specimen to be analyzed;
set spectroscopic conditions for wavelength dispersive X-ray spectrometer (WDS) analysis using the wavelength-dispersive X-ray spectrometer based on the analysis result of the preparatory analysis; and
perform the WDS analysis on the specimen to be analyzed under the set spectroscopic conditions.

2. The analyzer according to claim 1, further comprising:
a database that stores, for each type of a specimen, information on elements included in the specimen and information on respective concentrations of the elements included in the specimen, wherein
the analysis result of the preparatory analysis comprises a result of quantitative analysis performed on the specimen, and
the control unit is configured to perform processing to set the spectroscopic conditions by:
searching the database to extract a specimen having a result highly similar to the result of the quantitative analysis;
acquiring, from the database, information on elements included in the extracted specimen and setting the elements included in the extracted specimen as analysis target elements; and
setting the spectroscopic conditions based on the set analysis target elements.

3. The analyzer according to claim 2, wherein the database comprises, as the information on the elements included in the specimen, an element which is not detectable in the preparatory analysis, but is detectable in the WDS analysis.

4. The analyzer according to claim 2, wherein, when the number of the analysis target elements is larger than the number of simultaneously measurable elements, the control unit performs processing of setting an order of measurement based on the result of the preparatory analysis.

5. The analyzer according to claim 1, further comprising:
a database that stores, for each type of a specimen, information on elements included in the specimen, information on respective concentrations of the elements included in the specimen, and information on spectroscopic conditions for the specimen, wherein the analysis result of the preparatory analysis comprises a result of quantitative analysis performed on the specimen, and the control unit is configured to perform processing to set the spectroscopic conditions by:

searching the database to extract a specimen having a result highly similar to the result of the quantitative analysis; and acquiring, from the database, information on spectroscopic conditions for the extracted specimen and setting the spectroscopic conditions.

6. The analyzer according to claim 1, further comprising:

a database that stores, for each type of a specimen, information on a spectrum of the specimen, wherein the analysis result of the preparatory analysis comprises a spectrum of the specimen to be analyzed, and the control unit is configured to perform processing to set the spectroscopic conditions by:

searching the database to extract a specimen having a spectrum highly similar to the spectrum of the specimen to be analyzed;

acquiring, from the database, information on elements included in the extracted specimen and setting the elements included in the extracted specimen as analysis target elements; and setting the spectroscopic conditions based on the set analysis target elements.

7. The analyzer according to claim 1, further comprising:

a database that stores, for each type of a specimen, information on a spectrum of the specimen and information on spectroscopic conditions for the specimen, wherein the analysis result of the preparatory analysis comprises a spectrum of the specimen to be analyzed, and the control unit is configured to perform processing to set the spectroscopic conditions by:

searching the database to extract a specimen having a spectrum highly similar to the spectrum of the specimen to be analyzed; and acquiring, from the database, information on spectroscopic conditions for the extracted specimen and setting the spectroscopic conditions.

8. The analyzer according to claim 1, wherein the control unit is configured to perform processing to set conditions for an electrooptical system in the WDS analysis based on the analysis result of the preparatory analysis.

* * * * *